United States Patent [19]

Enderle et al.

[11] Patent Number: 5,083,379
[45] Date of Patent: Jan. 28, 1992

[54] PROBE HEAD FOR A COORDINATE-MEASURING MACHINE

[75] Inventors: Eckhard Enderle, Aalen-Dewangen; Peter Aehnelt, Oberkochen, both of Fed. Rep. of Germany

[73] Assignee: Carl-Zeiss-Stiftung, Heidenheim/Brenz, Oberkochen, Fed. Rep. of Germany

[21] Appl. No.: 592,583

[22] Filed: Oct. 4, 1990

[30] Foreign Application Priority Data

Oct. 12, 1989 [DE] Fed. Rep. of Germany ....... 3934056

[51] Int. Cl.$^5$ ............................ G01B 5/20; G01B 7/28
[52] U.S. Cl. ......................................... 33/556; 33/559; 33/561
[58] Field of Search ................. 33/559, 560, 561, 556, 33/558

[56] References Cited

U.S. PATENT DOCUMENTS

| | | | |
|---|---|---|---|
| 3,520,063 | 7/1970 | Rethwish et al. | 33/561 |
| 4,203,225 | 5/1980 | Nilsson | 33/561 |
| 4,530,160 | 7/1985 | Feichtinger | 33/559 |
| 4,716,656 | 1/1988 | Maddock et al. | 33/559 |
| 4,866,854 | 9/1989 | Seltzer | 33/561 |
| 4,934,065 | 6/1990 | Hajdukiewicz et al. | 33/561 |
| 4,942,671 | 7/1990 | Enderle et al. | 33/559 |

Primary Examiner—Thomas B. Will
Attorney, Agent, or Firm—Hopgood, Calimafde, Kalil, Blaustein & Judlowe

[57] ABSTRACT

The invention concerns a probe head of the so-called measuring type with scales which supply signals proportional to the position of a probe pin in its deflected state. A probe-pin carrier is the movable part of the probe head, being mounted indirectly on at least three intermediate bodies which, in their turn, are guided linearly in a fixed or housing part of the probe head. As a result of the symmetrical arrangement of the linear guides and the identical mass of intermediate bodies, like inertial responses characterize probe deflection in all directions in space. The workpiece-contacting force is, therefore, independent of coordinate direction in a dynamic operation of the probe head, as in the course of a continuous scan of a workpiece profile.

27 Claims, 7 Drawing Sheets

PROBE HEAD FOR A COORDINATE-MEASURING MACHINE

BACKGROUND OF THE INVENTION

The invention relates to probe heads, as for use in a coordinate-measuring machine (a) having a part which carries the probe head and is mounted for guided deflection in all directions in space and (b) having an associated measurement system for detection of the displacement involved in the deflection.

Such probe heads are of the "measuring" type. They make it possible to detect displacement of the work-contact ball of the probe pin relative to the housing of the probe head, in the course of a deflecting displacement, i.e., while in the work-contacting state, so that the computer of the measurement system can add the amount of the deflection, to the position-measurement value supplied by the scales of the measuring machine; the computer can thus determine the instantaneous position of the probe ball within the measurement volume of the instrument. These measuring-type probe heads are therefore particularly suitable for so-called scanning techniques, in which the workpiece to be measured is scanned by a probe pin which is in continuous sliding contact with the surface of a workpiece.

In contradistinction to the probe heads of the "switching" type which supply a trigger signal only at the time of the initial contact with the workpiece, "measuring"-type contact heads have at least three linear measuring systems, which may employ moving coils or photoelectrically scanned scales which are associated with the respective guides which movably mount the probe pin.

The guides of known probe heads of the measuring type are, as a rule, directed, like those of the coordinate-measuring machine itself, along the axes of a Cartesian coordinate system. Conventionally, these probe guides are built one on top of the other, i.e. the x-guide carries the y-guide, and the z-guide is carried by the y-guide.

Such a probe head is described in U.S. Pat. No. 3,869,799, wherein the respective guide systems are developed as spring parallelograms which are attached to each other. The probe head described in U.S. Pat. No. 4,611,403 also has, in principle, a very similar construction but in its case, the guides are made free of friction, using air bearings between parts which slide on each other.

As a result of the construction described, the movable masses are of different value in the individual coordinate directions since at least one of the guides must, after all, assist in carrying the guide parts for the two other coordinate directions. Accordingly, the dynamic behavior in the individual axes is very different, so that different forces occur between probe pin and workpiece, particularly in a rapid scanning operation. The precision of the measurement is impaired by such variations in measurement force.

U.S. Pat. No. 4,530,159 describes a probe head having a probe pin which is movably mounted with respect to two coordinate directions, via a flat-plane guide having two degrees of freedom. However, in this case, the third guide is carried by the flat guide, in the direction perpendicular to said plane; thus, once again, different movable masses are involved in the respective individual guidance directions. Furthermore, this probe head requires an additional means to secure against torsion, in order to foreclose an undefined rotation of eccentric probe pins in the plane of the guidance system having two degrees of freedom. Since this torsion restraint enters into a determination of the accuracy of measurement, it must be developed in very precise fashion, thus entailing considerable additional expense.

BRIEF STATEMENT OF THE INVENTION

The object of the present invention is to provide a probe head of the measuring type which has substantially the same moving mass with respect to each of the directions of deflection; and it is the further object to assure that this mass shall be as small as possible.

The invention achieves these objects by indirectly mounting the movable part on at least three intermediate bodies which are linearly guided independently of each other.

Thus, in accordance with the invention, the guide systems are not mounted one on top of the other; instead, three or four so-to-speak "juxtaposed" auxiliary guides are provided so that, as a whole, a completely symmetrical construction is obtained with equal movable masses for all possible directions of deflection. In achieving such symmetry, the directions of the auxiliary guides do not necessarily coincide with the three directions in space of an orthogonal coordinate system, but they can advantageously be arranged parallel to each other, to achieve a compact and slender construction of the probe head.

Furthermore, the symmetrical construction makes it possible to use a very large number of identical parts, thus simplifying manufacture and reducing the cost of the probe head.

The movable part of the probe head is so indirectly connected to intermediate bodies linearly guided by the auxiliary guides that the position of the movable part can be unambiguously associated with a given position of the intermediate bodies, for all components of probe-pin displacement. This being the case, it is possible to so fixedly arrange the active parts of the deflection-measurement system in the probe-head housing that intermediate-body displacements are detected, and the instantaneous position of the probe pin is calculated from the measured positions of the intermediate bodies.

In mounting the movable part of the probe head, three flat surfaces are advisedly provided on this movable part, and these three flat surfaces are directed at an angle to each other; these three flat surfaces coact with corresponding mating surfaces of each of the respective intermediate bodies. Pressure-fluid (gas or air) bearing techniques can provide friction-free coaction along these guide surfaces, and the same techniques can provide friction-free linear guidance for the intermediate bodies with respect to the part fixed to the housing.

It is also possible to support the movable part of the probe head at two points of contact on each of the three linearly guided intermediate bodies. By this total of six contact points, the position of the movable part of the probe head is also always determined unambiguously, and friction can be greatly reduced, by developing the contact points as, for example, balls which roll between surfaces.

The quality of guidance of the moving part of the probe head on the intermediate bodies is dependent on the preload force with which the parts engage each other. So-called regenerative air bearings make it possible for the preload force to develop from coaction between the movable part and the respective intermediate bodies.

On the other hand, in use of the invention without air bearings, a further bearing is provided for the movable part of the probe head; this further bearing provides for preloading the at-least three bearings between the movable part and the respective intermediate bodies. And it may be particularly advantageous to initially load the first at least three bearings, using an equal number of additional bearings, the additional bearings being formed by corresponding surfaces on the movable part of the probe head, said corresponding surfaces being arranged parallel to the surfaces of the first bearings. The loading force of the guides can then be adjusted independently of the measurement force.

In advantageous embodiments, the measurement force can also be applied actively via force generators such as compressed-air pistons or moving coils by which the intermediate bodies are driven. This type of active measurement-force application also makes it possible to pre-deflect the probe pin in certain directions, as for feed movements in the direction of the workpiece, and thus increase the free travel, as well as to make certain directions of deflection more yielding or more stiff, depending on the direction in which scanning is effected along the surface of the workpiece to be measured.

DETAILED DESCRIPTION OF THE INVENTION

The invention will be described in detail for several embodiments, in conjunction with the accompanying drawings, in which:

FIG. 1b is a section through the probe head of FIG. 1a, along the line Ib—Ib of FIG. 1a;

FIG. 2b is a section through the probe head of FIG. 2a, along the line IIb—IIb of FIG. 2a;

FIG. 3a is another view similar to FIG. 1a, for a third embodiment of the invention, slightly modified as compared with FIG. 1a;

FIG. 3b is a perspective view of one of the intermediate bodies (119) of the embodiment of FIG. 3a;

FIG. 4 is an enlarged fragmentary section detail for an engaged relationship which is slightly modified as compared with a corresponding relationship in the embodiment of FIG. 3a;

FIG. 5 is a block diagram schematically showing electropneumatic control circuitry for the probe head of FIG. 3a;

Figure 1A:
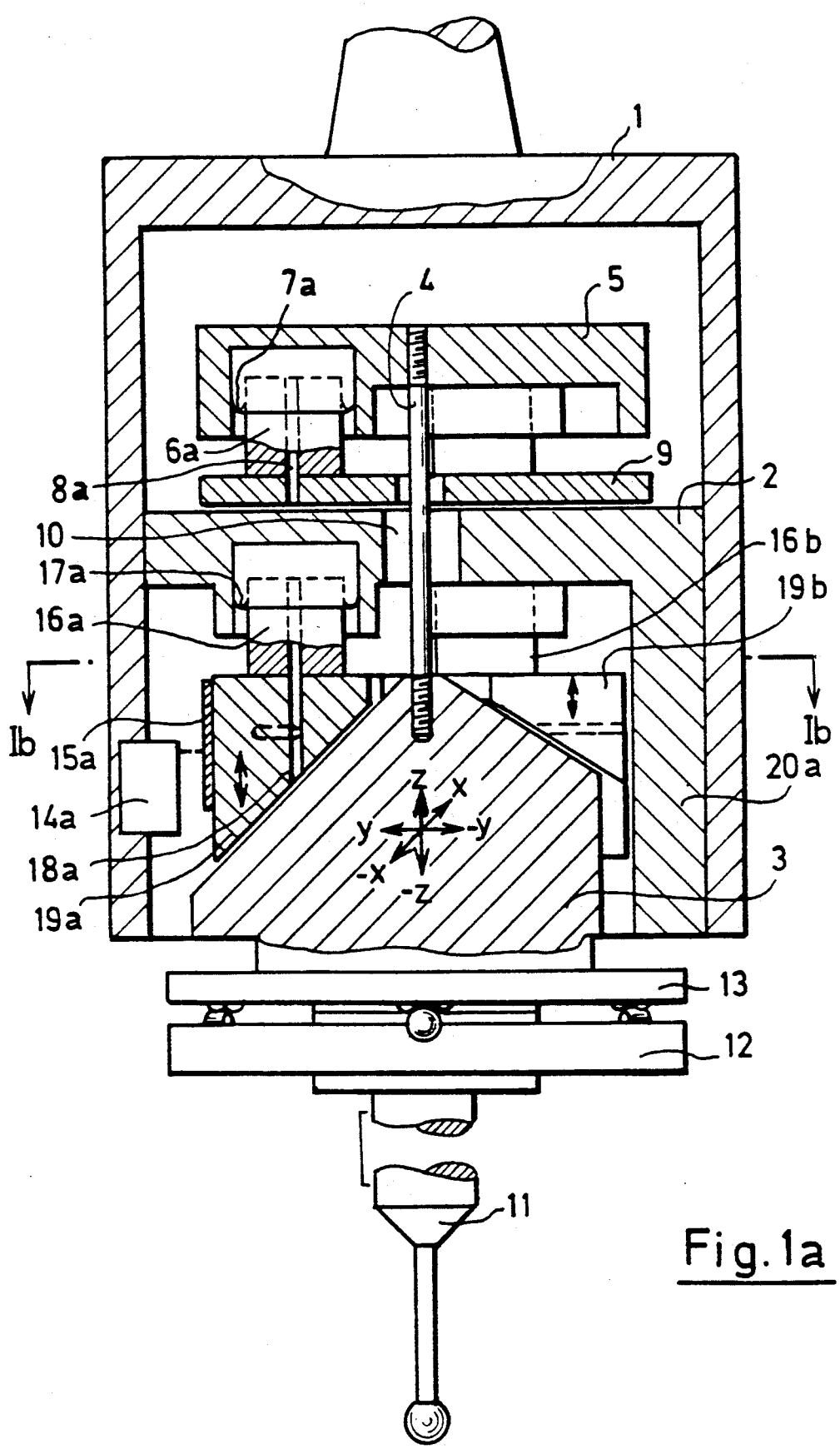
FIG. 1a is a view in cross section, in a plane containing the longitudinal axis of the probe of a probe head of the invention.
Figure 1B:
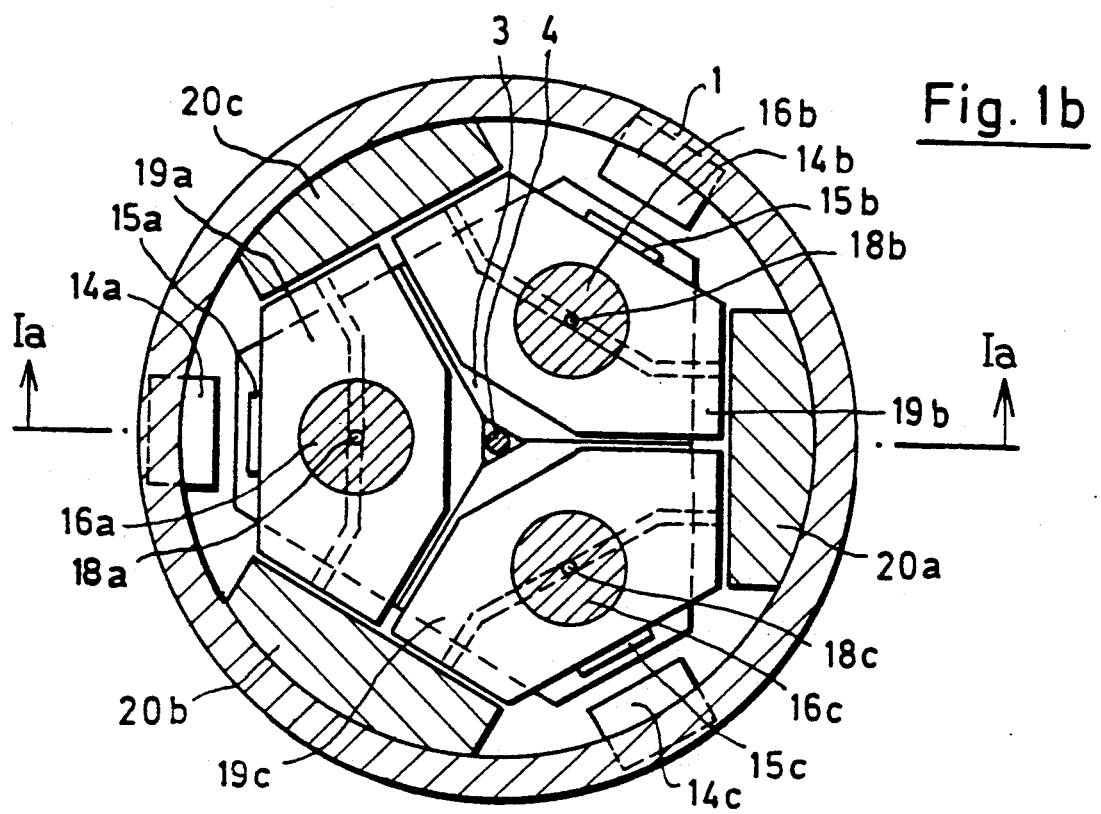

The probe head of FIGS. 1a and 1b has a cylindrical housing 1 which is open at its lower end, and a probe-pin carrier member 3 within the open end is shown detachably mounting a probe pin 11 via releasable connection means 12-13, as of the nature described in U.S. Pat. No. 4,637,119. Member 3 and its probe pin 11 are deflectably movable with respect to the housing all three Cartesian-coordinate directions, as indicated by x-y-z axis symbolism, and detailed discussion will be concerned with suspension and measurable deflection of member 3, with respect to housing 1.

An inserted annular ring 2 is fixed by mounting at a longitudinally central location within housing 1. Three guide formations 20a, 20b, 20c, at 120° spacings, extend longitudinally and integrally from the outer circumference of ring 2, and in the direction of the open lower end of the housing. The guide formations (20) have radially inwardly facing sides which provide linearly guided air-bearing support for three intermediate bodies or guide blocks 19a, 19b, 19c, such that each guide block (19) relies on the inwardly facing surfaces of two adjacent guide formations (20), for guided sliding displacement thereon, over air bearings and in the direction of the longitudinal axis of the probe. Each of the guide blocks (19) has the shape of a six-sided prism, and the downwardly facing base surface of each guide block (19) is beveled at an angle to the longitudinal axis of the probe. The slope orientation of each of these base surfaces is such that, when assembled, the three involved base surfaces define a tetrahedral concavity. Correspondingly, the upper side of the movable member or probe-pin carrier 3 has the convex formation of a tetrahedron or of the corner of a cube, the surfaces of the convex formation being sloped to conform with and rest against the beveled base surfaces of the three guide blocks 19.

The linearly displaceable guide blocks 19a, 19b, 19c are acted on by pressure-fluid cylinders inserted and carried by the fixed ring 2, and the pistons 16a, 16b, 16c of these cylinders are secured to the respective upper ends of the guide blocks 19a, 19b, 19c. As shown, a flexible membrane (17) seals each of the corresponding pistons (16) from the inner wall of its associated cylinder.

Central passages 18a, 18b, 18c through the pistons 16a, 16b, 16c establish pressure-fluid communication, for each of the three cylinders, (a) with the air bearings via which the movable member or probe-pin carrier 3 reacts with the inclined lower surfaces of the respective guide blocks (19), as well as (b) with the air bearings via which the guide blocks (19) react to derive linear sliding guidance from the inner surfaces of the guide formations (20).

To clamp the air bearings between the probe-pin carrier 3 and the guide blocks 19a, 19b, 19c, the probe-pin carrier 3 is thread-connected, via a tie rod 4 to a disk 5; three pressure pistons 6a, 6b, 6c, arranged 120° apart, are guided in corresponding pressure cylinders in the underside of disk 5, the piston/cylinder relation being sealed via flexible membranes 7a, 7b, 7c. In this connection the tie rod 4 extends through a central opening 10 in the ring (2) which is fixed to the housing. The pistons 6a, 6b, 6c are mounted to an annular plate 9 which floats while supported perpendicular to the longitudinal axis of the probe, such support being provided by means of three air bearings on the upper surface of the fixed ring 2. The pressure cylinders of disk 5 similarly communicate via passages 8a, 8b, 8c, within the respective pistons 6a, 6b, 6c to supply pressure fluid to these air bearings. It will be understood that feed lines to all pressure-fluid cylinders have been omitted, to avoid clutter in the drawing.

On the outer side of each of the guide blocks 19, i.e. on the side which confronts the inner wall of the housing 1, longitudinally extending glass scales 15a, 15b, 15c are affixed to the guide blocks 19a, 19b, 19c, and these scales are scanned by corresponding scanning heads 14a, 14b, 14c mounted to the inner wall of the housing 1. Three longitudinal measurement systems are established by the respective scale-scanner combinations 14a/15a, 14b/15b and 14c/15c, and these three measurement systems precisely determine, in the direction of the probe axis, the instantaneous longitudinal position of the three surfaces of the concave tetrahedron defined by the inclined lower ends of the guide blocks (19).

The above-described probe head operates as follows:

If the fluid pressure exerted by each of the cylinders serving the three pistons (16a–c) is set to the same value, and if the fluid pressure in the cylinders serving pistons (6a–c) is increased by an amount which compensates for the weight of the movable member 3, together with the parts (11, 12, 13) which it mounts, then the probe pin and its carrier 3 can very easily be held in a central position which corresponds approximately to the position shown in the drawing. In the course of a scanning procedure, the probe-pin carrier 3 is displaced by the contact between the probe pin 11 and the workpiece. In this connection, carrier 3 slides with one component of motion along inclined surfaces of guide blocks (19), and this component of motion in turn effects corresponding guide-block displacement along involved linear guide means, namely, in the direction of the longitudinal axis of the probe. This is indicated in FIG. 1a by corresponding double-headed arrows on the guide blocks 19a and 19b. The measurement systems (14a–c/15a–c) measure such displacement of the guide blocks (19a–c). From the three measured values, the position of the probe-pin carrier 3 can always be unambiguously calculated from knowledge of the inclination of the slide surfaces. It is a prerequisite for this, either that the sloping surfaces of the probe-pin carrier 3 and of the guide blocks (19) remain in contact with each other, or that the gap of the corresponding air bearings remain constant; this condition is met by clamping via the parts (5 to 9) connected to the tie rod (4).

At this point, it should be mentioned that the clamping can be dispensed with, and the parts (5–9) thus eliminated, if so-called regenerative air bearings are used for the air bearings between the surfaces of the probe pin carrier 3 and the guide blocks (19); such regeneration may be as described in U.S. Pat. No. 4,558,909, and it suffices here to note that, in addition to an air-feed passage, such regenerative bearings have a suction passage to produce a vacuum in regions of the surface adjoining the bearing.

Figure 2B:
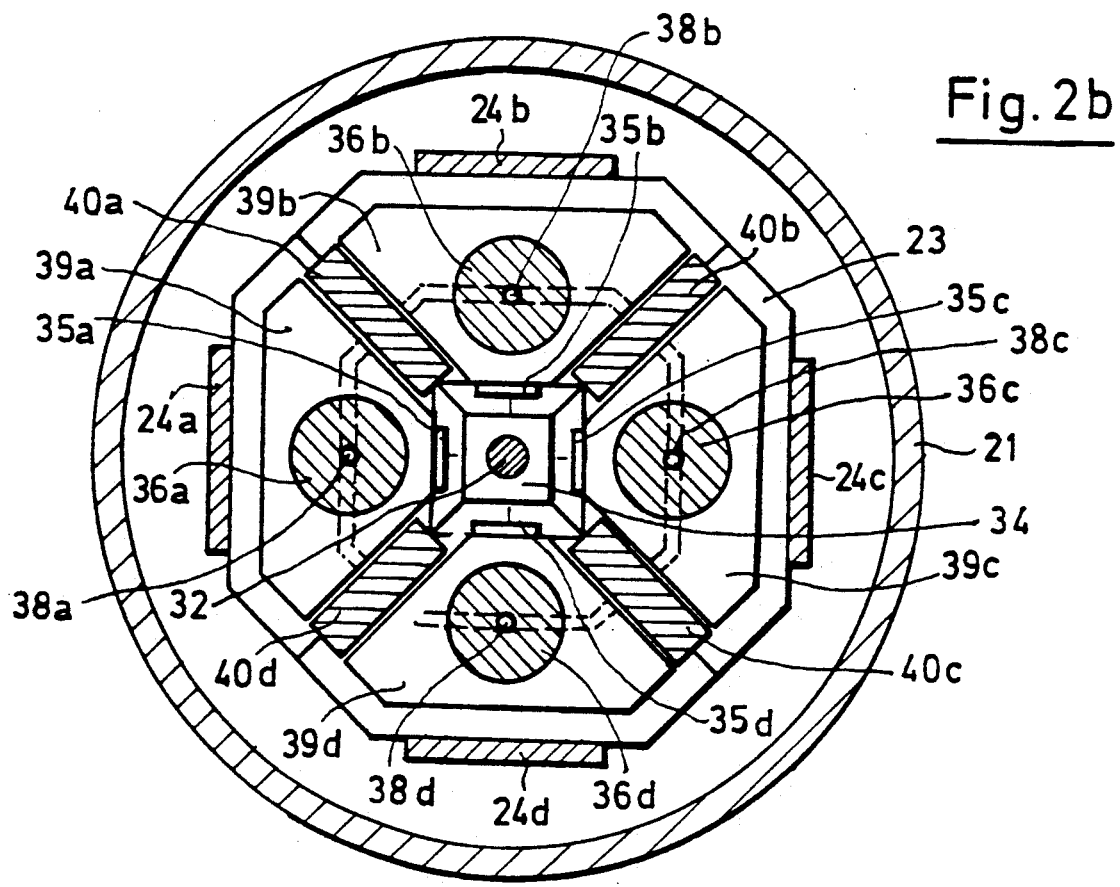
Figure 2A:
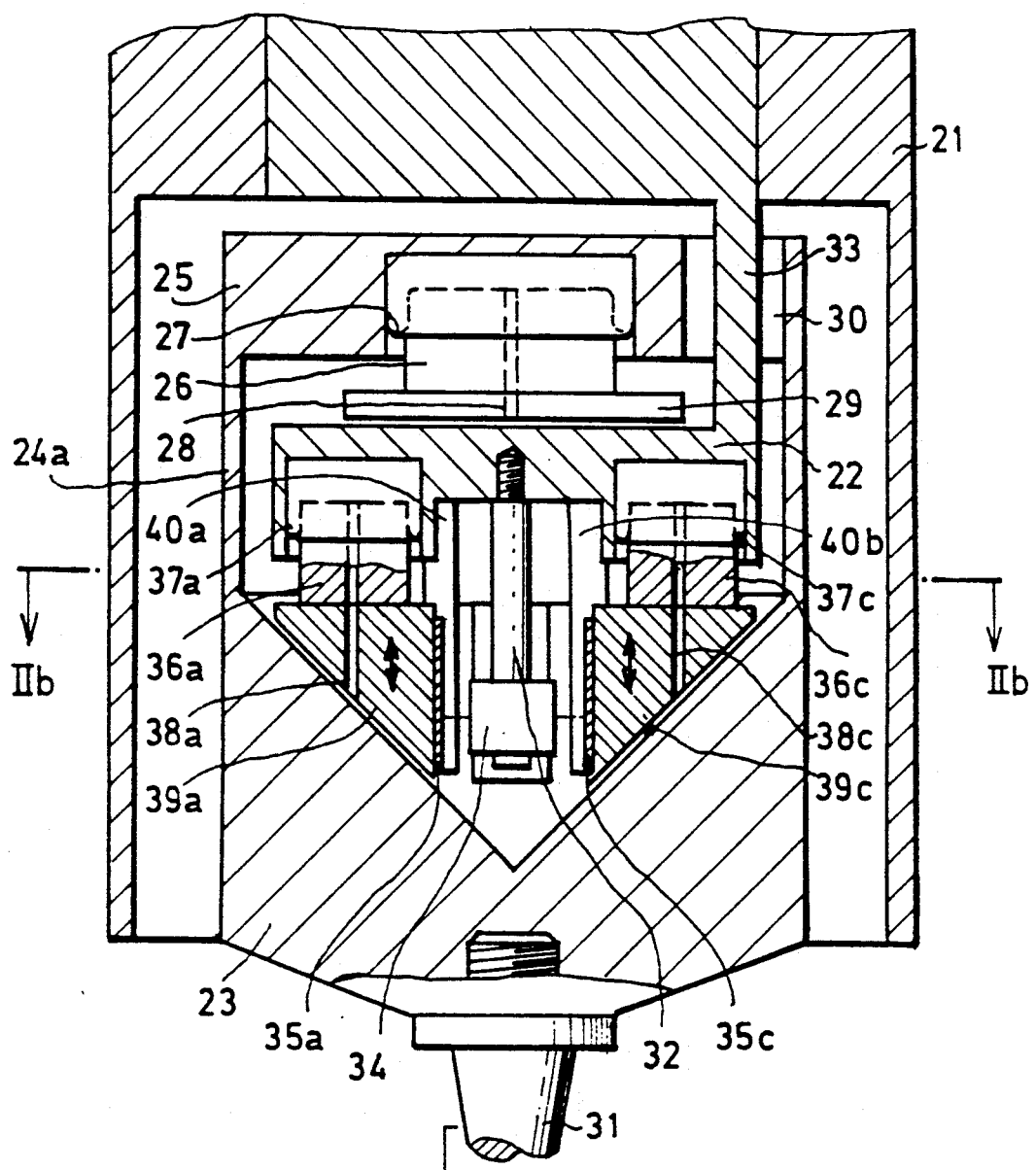
FIG. 2a is a view similar to FIG. 1a, for a second probe-head embodiment of the invention.

FIGS. 2a and 2b show an alternative probe-head embodiment, modified from FIGS. 1a and 1b in various respects. Within the stationary housing 21, a plate 22 having a flat upper surface is fixedly positioned via three legs 33 arranged 120° apart and extending in the direction of the probe pin 31, shown with a longitudinally extending pin 31a and a plurality of laterally extending pins 31b and 31c. A piston 26, flexibly sealed via a membrane 27 with respect to a pressure cylinder, floats on the flat surface of plate 22, via an air-bearing member 29; the pressure cylinder communicates via a passage 28 in piston 26 to the involved air bearing. The pressure cylinder is formed by a central bore in a plate 25 from which the movable part of the probe head, i.e. the probe-pin carrier 23, is suspended via four legs (24) which also extend downward in the direction toward the probe pin 31. In the arrangement described, the three legs 33 of the stationary part extend through three openings 30 of suitable size in plate 25, with ample clearance to permit lateral displacement of movable probe-pin related parts.

The upwardly facing end of the probe-pin carrier 23 is provided with four surfaces which are inclined obliquely to the axis of the probe pin and form a depression in the form of an inverted concave quadrilateral pyramid. The mating surfaces of four guide blocks (39a–d) are matched to said four surfaces. Here again, air bearings are arranged between the four surfaces of the concavity of the probe-pin carrier 23 and the mating surfaces of the guide blocks, as indicated by passages (38a–d). The guide blocks (39a–d) are movable linearly in the direction of the axis of the probe pin along the surfaces of four angularly spaced finger-like guide parts (40a–d). Pressure cylinders are also again associated with the guide blocks (39a–d), with corresponding pistons (39a–d) and flexible seal membranes (37a–d). The pressure cylinders are formed by limited bores open to the lower surface of the carrier plate 22.

From the lower surface of plate 22, a downwardly extending rod 32 carrier will be understood to mount a housing 34 containing four reading heads for continuous reading of each of four longitudinal scales (35a–d) to the respective guide blocks (39a–d).

One advantage of the FIG. 2a/2b arrangement of the inclined guide surfaces, which is inverted as compared with FIGS. 1a and 1b, resides in the greater resistance to torsional displacement of the probe pin, as in the event that a workpiece is contacted out of the plane of FIG. 2a by one of the laterally extending probe pins (31b and 31c). This greater torsional resistance results from the fact that torsional forces acting on the guide blocks (39a–d), which are guided via air bearings between the four guide parts (40a–d), are directed perpendicular to the surfaces of the guide parts (40a–d). Another advantage resides in the quadruple symmetry of the guide blocks. The movements of the blocks can then be associated more easily with the Cartesian coordinate system of the measuring machine to which the probe head is mounted. It is furthermore possible to mechanically to clamp individual directions of deflection by means of a suitable lock, whereby pairs of opposite guide blocks (36a/36c or 36b/36d) are, for example, secured against relative movement. This would correspond to a clamping of the two horizontal coordinates x and y.

The manner of operation of the probe head shown in FIGS. 2a and 2b corresponds essentially to that of FIGS. 1a and 1b. The air bearings between the inclined lower surfaces of the guide blocks (39a–d) and the mating surfaces of the probe pin-carrier 23 are clamped together by the pressure pistons (36a–d) in combination with the individual pressure piston 26 which applies opposing force while permitting a friction-free sliding of the surfaces on each other. The pressure is so adjusted that the probe pin carrier 23 is either in a central position or is pre-deflected in the direction toward the workpiece to be measured. Upon workpiece contact, the probe pin and its carrier 23 are shifted; for such movement as is lateral of the probe-pin carrier 23, the guide blocks (39a–d) slide on the surfaces in the probe-pin carrier 23 and effect upward/downward displacements of guide blocks (39a–d). Such displacements are detected by the measurement systems (34a–d/35a–d).

Figure 3A:
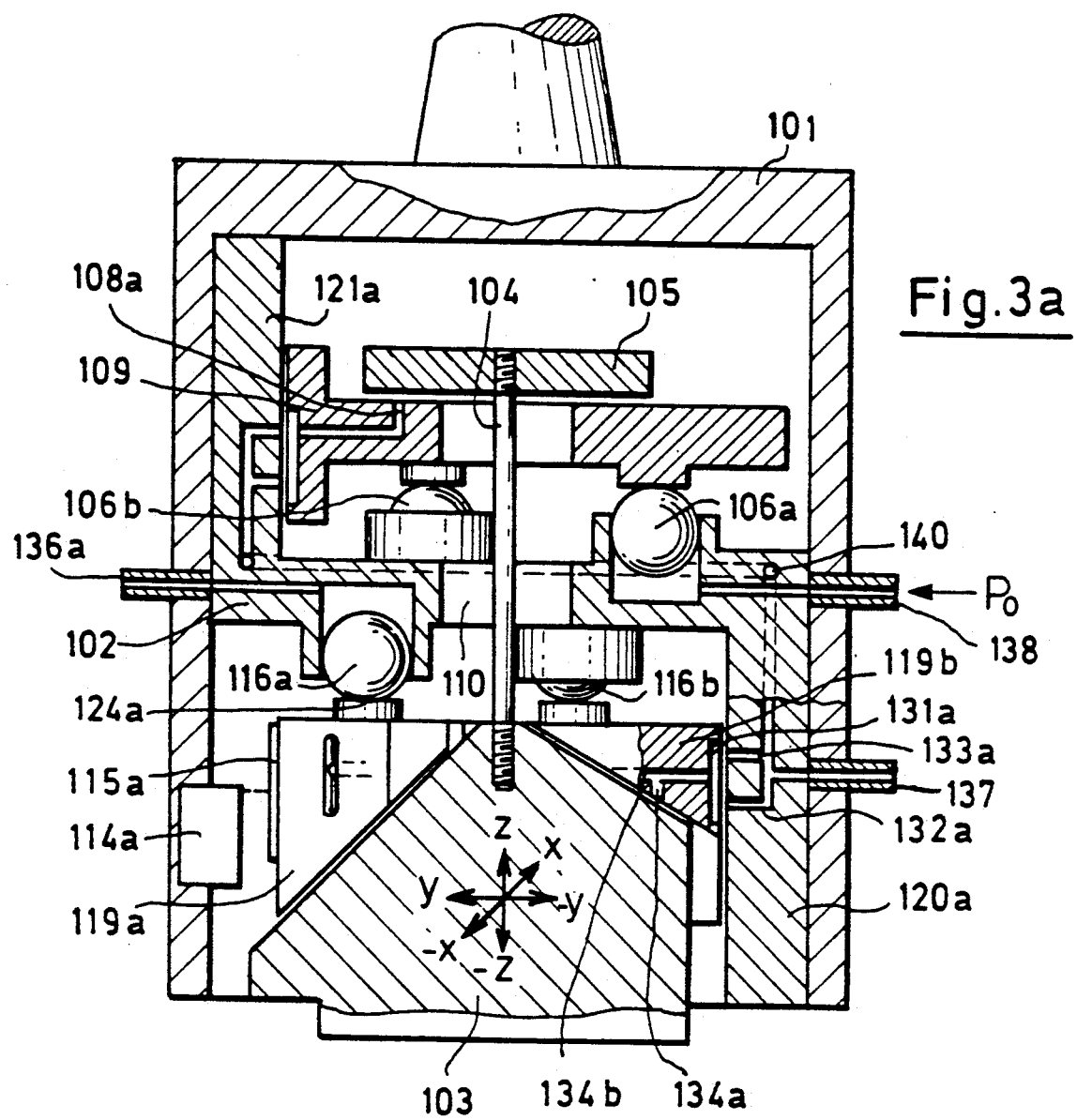
Figure 3B:
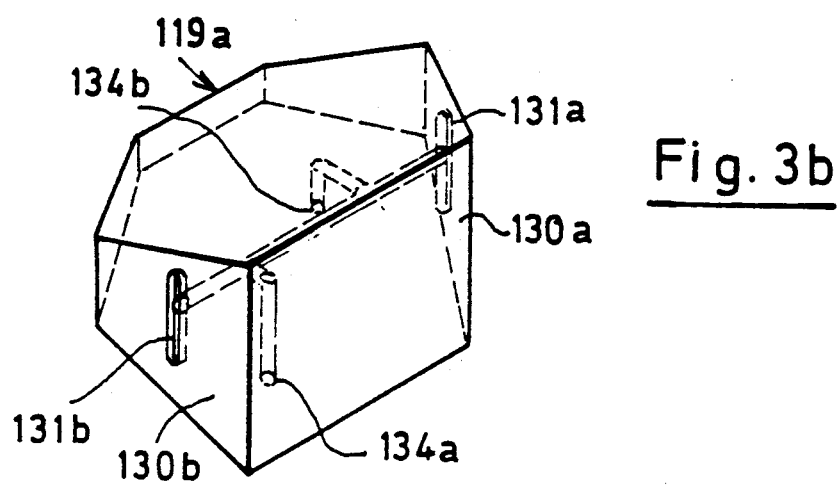

The embodiment of FIGS. 3a and 3b is a probe head which is only slightly modified as compared with that of FIGS. 1a and 1b. Therefore, in FIGS. 3a and 3b, reference numbers which are increased by 100 but otherwise the same are used for identical parts or for parts having identical function. It is therefore sufficient to discuss merely the differences or advantages as compared with the probe head of FIGS. 1a and 1b.

In FIG. 3a, balls (116a,b,c) are used as pressure pistons for the probe head. Under pressure, each ball presses with point contact on a polished base surface (124a–c) on the top side of one of the guide blocks (119a–c). This has several advantages. On the one hand, as a result of the air flowing laterally past them from the pressure cylinder, the balls move completely free of friction and canting is prevented so that, in addition, no transverse forces are exerted on the linearly guided guide blocks (119a–c). Furthermore, with this type of pressure piston, air escapes continuously from the pressure-fluid cylinder, and it is possible by controlling the rate of supplied air to effect very sensitive control of the pressure within the cylinder.

Further modifications are provided in the probe head of FIG. 3a, to preload the probe-pin carrier 103 against the reacting surfaces of the guide blocks (119a–c). To this end, three pressure pistons (106a–c), also of spherical shape, are provided in corresponding cylinders which are otherwise open at the upper surface of the fixed ring 102. A ring 109 is longitudinally displaceable in response to pressure-driven thrust of these balls (106a–c). In its turn, a plate 105, which is connected to the probe-pin carrier 103 by a tie rod 104, floats on ring 109. This arrangement has the advantage that all pressure-fluid cylinders are mounted on the stationary part of the probe head so that there is no need for flexible feed lines to the movable part of the probe head; without this arrangement, flexible feed lines would be required, thus entailing undesired forces acting on the movable parts.

Further in connection with the FIG. 3a embodiment, it is noted that flexible feed lines are not required for the involved air bearings since the air bearings for guiding the guide blocks (119a–c) extend along the longitudinal axis of the probe head, in the same way as feed lines to the air bearings for guidance of ring 109, i.e. the involved feed lines need only be in parts (120a–c and 121a–c) fixed to the housing. The air bearings via which the probe-pin carrier 103 has slidable engagement with the guide blocks (119a–c) are supplied indirectly with the bearing pressure of the guides of the guide blocks (119a–c) on the housing. This can be noted from the perspective showing of FIG. 3b. In accordance therewith, slotted openings 131a, 131b are arranged in the two guide surfaces 130a, 130b of the guide block 119a in the region of associated air nozzles 132a and 133a in the bearing part 120a (FIG. 3a), and the slots of openings 131a, 131b extend in the direction of guidance. From these slots, passages extend to two air nozzles 134a, 134b on the inclined surfaces of the guide block 119a.

An entirely similar solution is selected for air supply to the air bearing on the upper surface of the displaceable ring 109, thereby providing floating support of the disk 105 which serves for clamping the probe-pin carrier 103.

To supply all air bearings in the probe head, a first inlet fitting 137 is provided on the outside of the housing 101. An annular manifolding conduit 140 in the fixed part 102 connects the feed passages for bearings of ring 109 with those for the guide blocks (119a–c). The three pressure cylinders for the spherical pistons (106a–c) in the upper part of the probe head are supplied jointly from a second inlet fitting 138. On the other hand, the pressure cylinders for the balls (116a–c) which act on the guide blocks (119a–c) are individually connected to separate feed lines (136a–c).

Figure 5:
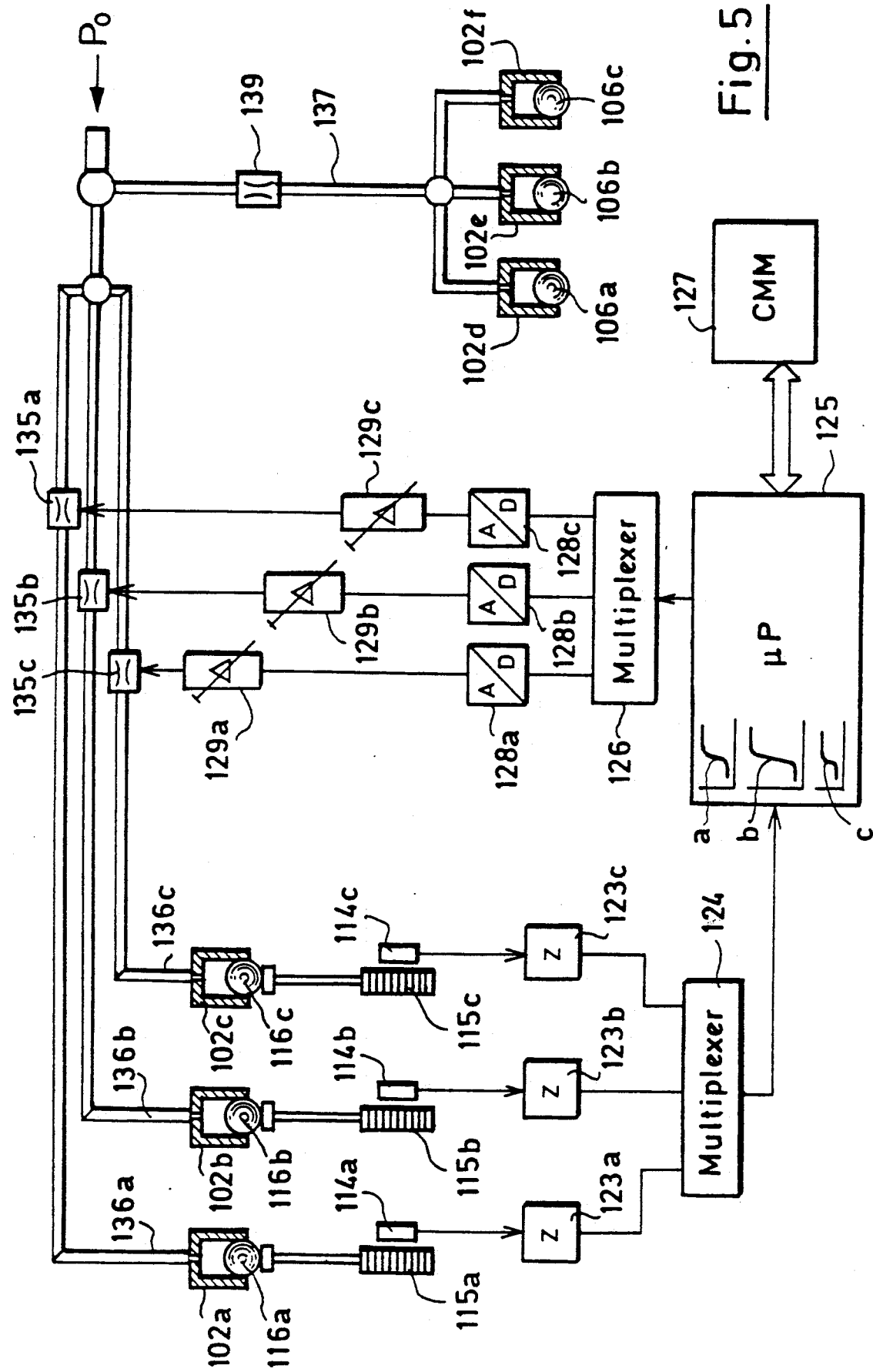

Operation of the probe head of FIGS. 3a and 3b can be further noted from the block diagram of FIG. 5, showing pneumatic and electrical control circuitry for this probe head. In FIG. 5, feed lines 136a, b and c supply compressed air to cylinders (102a, b and c) in which the spherical pistons (116a, b and c) are slidable. To control pressure in the pistons (102a–c) and thus to control the force which the pistons (116a–c) exert on the guide blocks (119a–c), a separate electrically switchable control valve (135a–c) is connected in each of the lines (136a–c). Each of control valves (135a–c) is an elemental part of an independent position-control circuit, which circuit also includes an associated one of the measurement systems (114a/115a and 114b/115b and 114c/115c) with which the position of the guide blocks (119a–c) is measured, i.e. each guide block (119a–c) is contained within a separate control circuit. The heart of the three control circuits is a microprocessor 125 which receives signals representing control variables required for regulation via a data line from the computer 127 of the coordinate-measuring machine (CMM). Illustratively, control variables may be the zero points which are to be set for the respective measurements systems. Via these zero points, inter alia, any desired pre-deflection of the probe-pin carrier 103 can also be set, in the direction toward the workpiece to be measured.

The three spherical pressure pistons 106a–c, by means of which the bearing surfaces are clamped between the probe-pin carrier 103 and the guide blocks 119a–c are guided in pressure cylinders (102d, e and f). Supply pressure $P_o$ is served in parallel to these pressure cylinders via a settable regulating valve 139, and the same supply pressure $P_o$ also supplies the three control valves 135a–c. In its at-rest state, when the probe pin is held, free of deflection force, in the zero point on its carrier 103, pressure in the pressure-fluid cylinders (102a–c) is identical to the pressure in the cylinders (102d–f) except for an amount which serves to compensate for the weight of carrier 103 and its probe pin. Adaptation to replaced probe pins of different weight can be effected by adjusting the offset, i.e. the basic setting of air flow through the three control valves (135a–c).

The microprocessor 125 is included via a multiplexer 124 in all three control circuits. In a time-division multiplexing operation, the multiplexer 124 serves for interrogating the respective instantaneous count condition of each of the counters 123a, b, c associated with the respective displacement-measuring systems 114a/115a, 114b/115b, and 114c/115c. This reading of each counter represents the actual position of a different one of the guide blocks (119a–c), as determined by the measurement systems (114a–c/115a–c).

The microprocessor 125 effects desired-value/actual-value comparison between measured position values and guide variables supplied by the computer 127, and calculates therefrom control variables for the three regulating valves (135a–c); the microprocessor transmits these variables as corresponding signals, via a second multiplexer 126 and three digital/analog converters (128a–c) associated with the three control circuits, to the amplifiers (129a–c) for controlling the regulating valves (135a–c).

Different parameters apply for determining the control characteristic of each of the three control circuits; therefore, the microprocessor 125 separately processes the control signals for each of these circuits. This is schematically shown by graphs of different slope, one below the other in the microprocessor 125 of FIG. 5. The slope of each control characteristic is selectively set and will be understood to determine the resilience or hardness of opposing force exerted by pressure pistons (116a–c) on the guide blocks (119a–c) and thus on the probe-pin carrier 103, all in reaction to deflection displacements in the course of contact with the workpiece. In this way, it is possible to so electronically "clamp" individual directions of deflection that a particularly "hard" reaction behavior is imparted, uniquely for a selected deflection direction. Further, the contact force, i.e. the force of probe-pin contact with the workpiece during the measurement can be adjusted via the control characteristic. The microprocessor 125 also receives the corresponding parameters from the computer 127 of the coordinate-measuring machine.

It should be pointed out that the described active control of restoring (reaction) force exerted on the probe-pin carrier 103 in each of the respective different directions makes it possible to orient the probe head 101 in different directions in space, while nevertheless retaining the zero point of the probe system. Furthermore, the system exhibits a fast response that is sufficient for response even to the varying moments that are encountered during a swinging displacement wherein the probe-head axis is reoriented in space.

Figure 4:
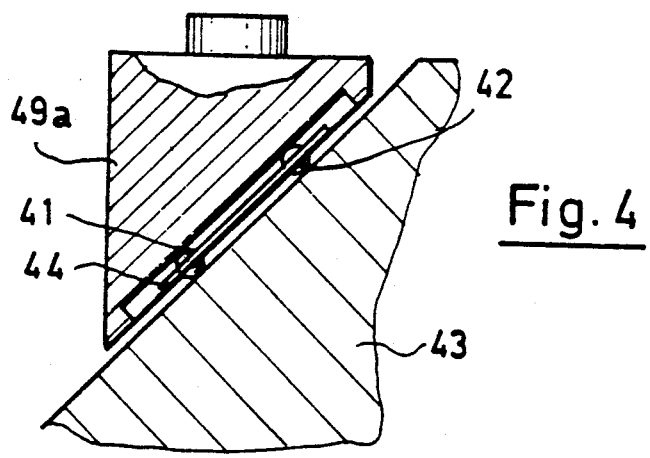

In the embodiments thus-far described, air bearings are used between the guide blocks and the corresponding surfaces on the probe-pin carrier, but it will be understood that it is also possible to use antifriction bearings in place of air bearings, as shown in the enlarged detail of FIG. 4. In this connection, it may be entirely sufficient to retain two balls 41, 42, as in a ball cage 44, and to arrange these balls between reacting surfaces, e.g. between the lower end of a guide block 49a and the corresponding mating surface on the probe-pin carrier 43; and since at least three of the guide blocks are required in the probe head, the probe-pin carrier 43 then rests on at least six points of reacting contact with the guide blocks. In this way, the position of carrier 43 is always unambiguously determined, as long as the surfaces on which the balls roll are sufficiently flat.

Figure 6:
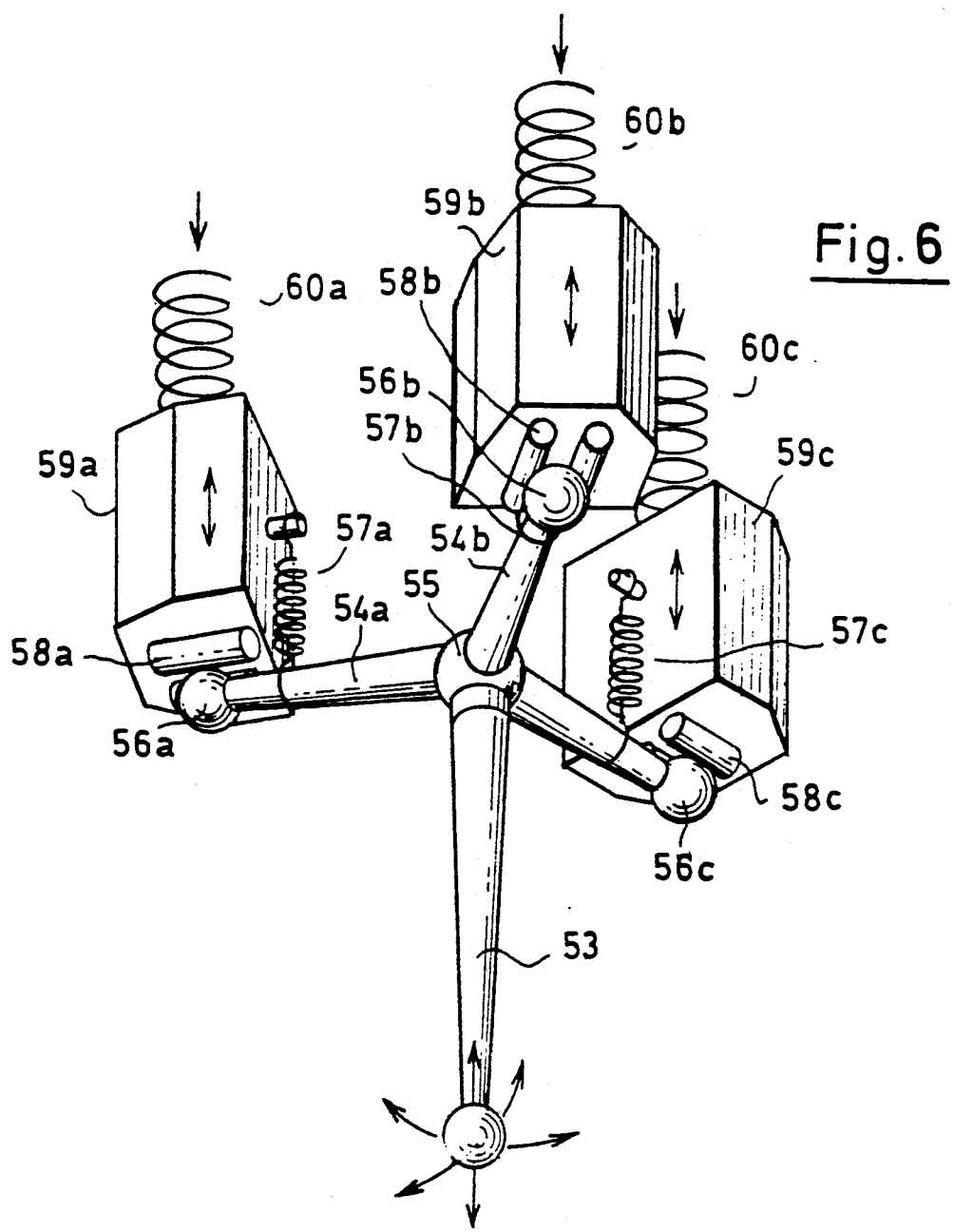
FIG. 6 is a simplified view in perspective, showing essential parts of a fourth embodiment of the invention.

Still further, it is not absolutely necessary to so develop the mounting on the guide blocks that the probe-pin carrier can perform only linear movements. A corresponding example which converts rotational movements of the probe pin into linear movements of three intermediate bodies or guide blocks is shown in FIG. 6, wherein for simplification of the drawing, the stationary (or fixed) part or the probe-head housing has been omitted. However, in FIG. 6, the intermediate bodies (59a, b and c) will be understood to be guided and displaceable linearly and in parallel in the housing and to be biased by springs (60a–c) into a base or at-rest position; and displacement of the intermediate bodies (59a–c) can be detected, as described in FIGS. 1 to 3, by measurement systems on the intermediate bodies (59a–c).

The front or lower end of each intermediate body (59a–c) mounts a pair of closely spaced, radially directed cylinders (58a, 58b and 59c). These three pairs of cylinders provide separate points of connection of bodies (59a–c) to the probe-pin carrier 55. The probe-pin carrier 55 is seen to comprise three arms (54a–c) radiating outward of the axis of probe pin 53, and balls (56a–c) on the ends of these arms engage the respective cylinder pairs (58a, b, c). This general type of mounting is known per se for so-called switching probe heads, in which case, during the course of a work-contacting procedure, the probe-pin carrier lifts off at least one of the three points of bearing contact; however, in the embodiment shown in FIG. 6, it is essential that the balls (56a–c) remain in contact with their respective cylinder pairs (58a–c), even upon rotary displacement of the probe pin 53. To this end, one of three tension springs (57a–c) is provided to assure that each of the arms (54a–c) is continuously held in connecting contact with its associated intermediate body (59a–c).

The FIG. 6 arrangement assures an unambiguous relationship between the position of the work-contacting ball at the end of the probe pin 53 and rectilineal displacement of the intermediate bodies (59a–c), in that rotational movements of the probe pin 53 are converted into linear movements of the three intermediate bodies (59a–c). The geometry between the probe-pin carrier 55 and its contact with each of the three intermediate bodies enables automatic calculation whereby the instantaneous position of the probe-pin ball can be determined, thus providing rotational-displacement data from measured rectilineal displacement of the intermediate bodies (59a–c) relative to the housing. Thus, a continuous scanning of the surface of a workpiece is also possible with a probe head as in FIG. 6, in contradistinction to known switching-type probe heads.

Figure 7:
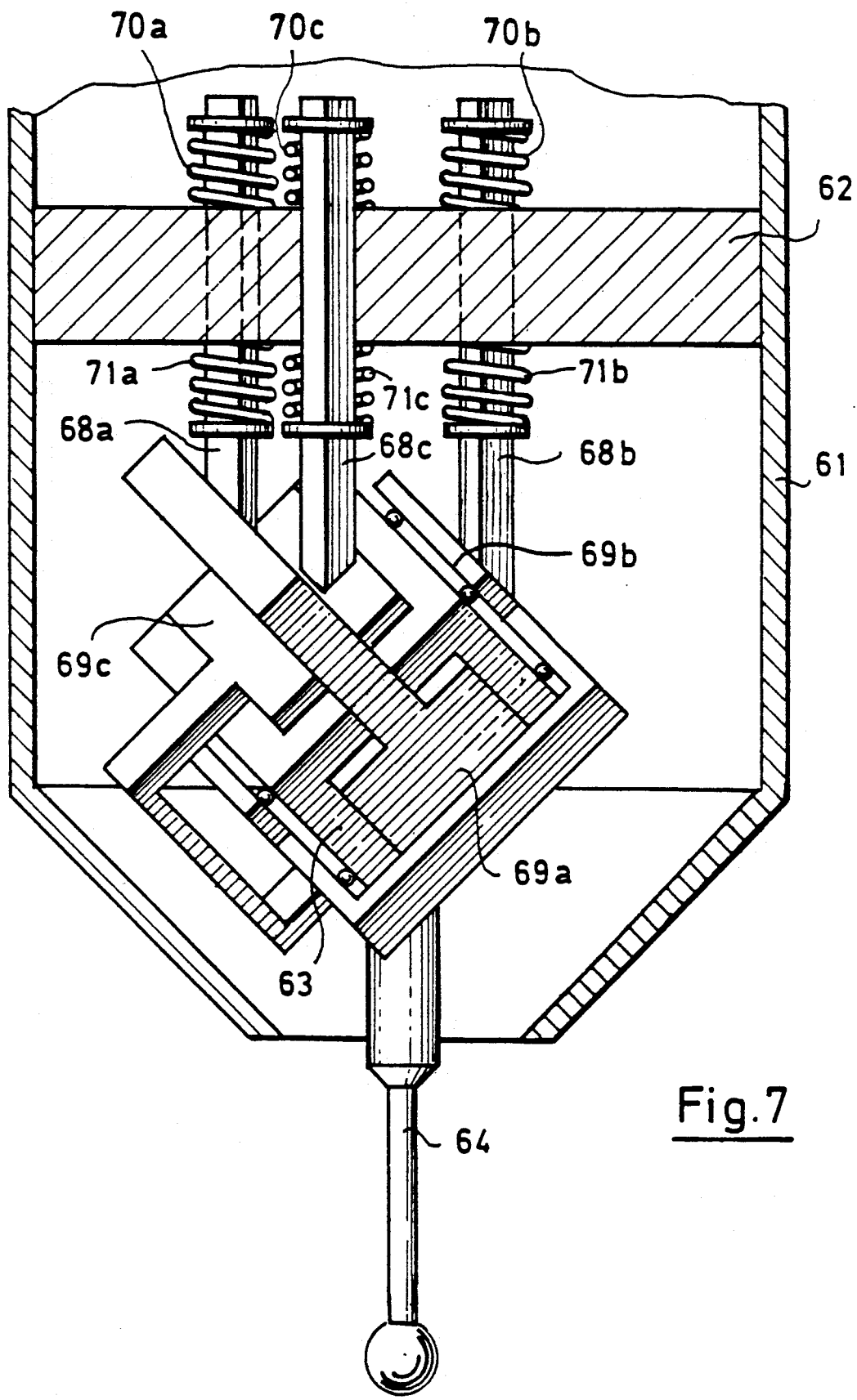
FIG. 7 is a view similar to FIG. 1a, partially in section and partially in elevation, for a fifth embodiment of the invention.

The embodiment of FIG. 7 illustrates a passive measuring-type probe head. A stationary housing is designated 61 and a cylindrical ring 62 which is inserted in and fixed to the cylindrical housing. The cylindrical ring 62 contains spaced parallel guides for three intermediate bodies (68a–c) which are displaceable linearly in the direction of the axis of a probe pin 64. These intermediate bodies (69a–c) are held resiliently in an axially central position by two pairs of springs (70a/71a, 70b/71b and 70c/71c) arranged on opposed axial sides of ring 62.

On the side facing the probe pin 64, each of the intermediate bodies (68a–c) carries a U-shaped yoke (69a–c), each yoke comprising a pair of spaced parallel arms. The paired arms of the U-shaped yokes are generally radially oriented 120° apart, about the axis of the probe pin and are so obliquely directed with respect to the axis of the probe pin that they engage opposite surfaces of the cube-shaped base end of a probe-pin carrier 63. The engaged relation is such that the respective arms of each U-shaped yoke have guided sliding action on a different one of the three pairs of opposed surfaces of the cube 63. A two-dimensional antifriction bearing is positioned between each pair of the thus-confronting surfaces of the cube and of each arm of the U-shaped yokes (69). However, in FIG. 7, such bearings are viewable only for the case of the U-shaped yoke 69b in relation to one of the three pairs of opposite sides of the cube 63. Although shown as a ball bearing, it will be understood that an air bearing will also serve at each such pair of confronting surfaces.

With the described embrace of all cube surfaces, by paired arms of U-shaped yokes, the prestressing of the surface bearings can be adjusted independently of the force which opposes probe-pin displacement during a retraction phase of the work-contacting procedure, since the latter is determined solely by the spring pairs (70/71).

In a scanning procedure, the cube-shaped probe-pin carrier 63 is displaced between paired arms of the yokes (69a–c), thereby displacing the yokes and thus also the intermediate bodies (68a–c). All intermediate-body displacements are in the direction of the longitudinal axis of the probe pin, and all such longitudinal displacements can be detected with measurement systems and used for the calculation of the actual position of the probe ball on the probe pin 64, in the same way as described for the other embodiments.

In the described embodiments, the three or four guide blocks are always displaceable parallel to each other in each probe head. Clearly, this permits a slender construction of the probe head, but slender construction is not absolutely necessary. For example, it is also possible to radially guide the guide blocks, i.e. radially with respect to the longitudinal axis of the probe, or perpendicular to the inclined surfaces of the probe-pin carrier. There is then obtained more of a short, flat construction of the probe head referred to the axis of the probe.

What is claimed is:

1. A probe head for a coordinate-measuring machine (i) having a probe-pin mounting part which is supported via a plurality of guides for deflected movement in all directions in space and (ii) having associated measurement systems for the detection of the deflection movement, wherein the movable part (3; 23; 53; 63; 103) is movably mounted indirectly on at least three intermediate bodies (109a–c; 39a–d; 68a–c; 69a–c; 169a–c) which are linearly guided independently of each other, said movable part having at least three flat surfaces directed at an angle to each other, and each intermediate body having a surface which mates with one to the exclusion of others of said at least three flat surfaces.

2. A probe head according to claim 1, wherein the guidance directions of said at least three intermediate bodies are parallel to each other.

3. A probe head according to claim 1, wherein pressure-fluid bearings (18a–c; 38a–d; 134a, b) are arranged between the mating surfaces.

4. A probe head according to claim 3, wherein the probe head includes a stationary part, and wherein the intermediate bodies are also guided linearly via pressure-fluid guidance bearings with respect to the stationary part of the probe head.

5. A probe head according to claim 4, in which said stationary part includes means for supplying pressure fluid to the pressure-fluid bearings by which said intermediate bodies are independently guided, and in which passages in said intermediate bodies communicate pressure-fluid from said guidance bearings to the bearings between said mating surfaces.

6. A probe head according to claim 3, wherein at least one additional bearing (8a; 28; 108a) for the movable part (3; 23; 103) of the probe head is provided which serves for the pre-loading of the at least three bearings (18a–c; 38a–d; 118a–c) between the movable part and the intermediate bodies (19a–c; 39a–d; 119a–c).

7. A probe head according to claim 5 wherein the first at least three bearings are pre-loaded by an equal number of further bearings, the further bearings being formed by corresponding surfaces on the movable part (63) of the probe head (61), said surfaces being parallel to the surfaces of the first bearings.

8. A probe head according to claim 1, said movable part (43) having two points of independent mounting contact (41/42) with each of the three intermediate bodies (49a) which are linearly guided independently of each other.

9. A probe head according to claim 1, said probe head including a stationary part, and said measurement systems (114a–c; 15a–c; 34a–d/35a–d; 114a–c/115a–c) being positioned to detect linearly guided movement of the respective intermediate bodies relative to the stationary part (1, 21, 101) of the probe head.

10. A probe head according to claim 8, wherein force generators for active drive of the intermediate bodies are provided in the probe head, and wherein the measurement systems (114a–c/115a–c) and the force generators (116a–c/120a–c) of each intermediate body are connected in each case into a control circuit, and wherein the characteristic of each control circuit can be adjusted separately.

11. A probe head for a coordinate-measuring machine (i) having a probe-pin mounting part which is supported via a plurality of guides for deflected movement in all directions in space and (ii) having associated measurement systems for the detection of the deflection movement, wherein the movable part (3; 23; 53; 63; 103) is movably mounted indirectly on at least three intermediate bodies (19a–c; 39a–d; 59a–c; 68a–c; 69a–c; 169a–c) which are linearly guided independently of each other, and force generators (16a–c; 36a–d; 116a–c) for active drive of the intermediate bodies in the probe head.

12. A probe head according to claim 11 wherein the force generators are compressed-air pistons (16a–c; 36a–d; 116a–c).

13. A probe head according to claim 11, wherein the force generators are preloaded coil springs.

14. A probe head for a coordinate-measuring machine, said head comprising a fixed part adapted for mounting to said machine, and a movable probe-pin mounting part having a central axis and at least three flat surfaces, said surfaces being at equal angular spacing about said axis and also inclined at equal angles to said axis, at least three intermediate bodies guided for independent lineal displacement with respect to said fixed part and on guide alignments parallel to said axis and at equal angular spacing about said axis, each said intermediate body having an inclined surface which continuously mates with one to the exclusion of others of said at least three flat surfaces, and separate measurement means coacting between each said intermediate body and the fixed part of said head for individually measuring displacements of each said intermediate body whereby to generate data for monitoring of the instantaneous point of contact of a probe pin mounted to said mounting part.

15. The probe head of claim 14, and means continuously and independently loading each of said intermediate bodies in the direction of mating contact with the respective inclined flat surfaces of said movable probe-pin mounting part.

16. The probe head of claim 15, and further means continuously loading said movable probe-pin mounting part in the direction of continuous mating with the inclined surfaces of said intermediate bodies.

17. The probe head of claim 15, in which said loading means is pressure-fluid operated.

18. The probe head of claim 15, in which said loading means is a coil spring.

19. The probe head of claim 16, in which each of said loading means is pressure-fluid operated.

20. The probe head of claim 16, in which each of said loading means is a coil spring.

21. The probe head of claim 14, in which three is the number of the flat surfaces of said movable part, and in which said flat surfaces are oriented in the geometrical relation of three like adjacent sides of a tetrahedron, wherein said three sides are symmetrically positioned about said central axis.

22. The probe head of claim 14, in which four is the number of the flat surfaces of said movable part, and in which said flat surfaces are oriented in the geometrical relation of four like adjacent sides of a square pyramid, wherein said four sides are symmetrically positioned about said central axis.

23. A probe head for a coordinate-measuring machine, said head comprising a fixed part adapted for mounting to said machine, and a movable probe-pin mounting part having a central axis and three like arms extending radially outward from a point on said axis and at equal angular spacings about said axis, three intermediate bodies guided for independent lineal displacement with respect to said fixed part and on guide alignments parallel to said axis and at equal angular spacing about said axis, coacting like universal-action connections between the end of each mounting-part arm and an end of one to the exclusion of others of said intermediate bodies, and separate measurement means coacting between each said intermediate body and the fixed part of said head for individually measuring displacements of each said intermediate body whereby to generate data for monitoring of the instantaneous point of workpiece contact for a probe pin mounted to said mounting part, each end of each mounting-part arm being biased against said one of said intermediate bodies and resting only on its associated intermediate body.

24. A probe head for a coordinate-measuring machine, said head comprising a fixed part adapted for mounting to said machine, and a movable probe-pin mounting part having a central axis and a cube formation at one end location on said axis, with said axis extending between two diagonally opposed corners of the cube formation, three intermediate bodies guided for independent lineal displacement with respect to said fixed part and on guide alignments parallel to said axis and at equal angular spacing about said axis, each intermediate body having two spaced parallel arms which are inclined for slidable engagement with one pair of opposed sides of the cube to the exclusion of the other pairs of opposed sides of the cube, and separate measurement means coacting between each said intermediate body and the fixed part of said head for individually measuring displacements of each said intermediate body whereby to generate data for monitoring of the instantaneous point of workpiece contact for a probe pin mounted to said mounting part.

25. A probe head for a coordinate-measuring machine, said head comprising a fixed part adapted for mounting to said machine, and a movable probe-pin mounting part having a central axis and at least three flat surfaces, said surfaces being at equal angular spacing about said axis and also inclined at equal angles to said axis, at least three intermediate bodies guided for independent lineal displacement with respect to said fixed part and on guide alignments parallel to said axis and at equal angular spacing about said axis, each said intermediate body having an inclined surface which continuously mates with one to the exclusion of others of said at least three flat surfaces, fluid-pressure supply means communicating with each pair of mating surfaces whereby continuous mating is in each case via a film of pressure-fluid flow, and separate measurement means coacting between each said intermediate body and the fixed part of said head for individually measuring displacements of each said intermediate body whereby to generate data for monitoring of the instantaneous point of contact of a probe pin mounted to said mounting part.

26. The probe head of claim 25, and preloading means comprising like fluid-pressure operated ball piston/cylinder configurations at equal angular spacing about the central axis, there being one such configuration in loading relation with each intermediate body and in the direction of loading the mating relation of each intermediate body with said probe-pin mounting part.

27. The probe head of claim 26, wherein lines of pressure-fluid supply independently serve the respective cylinder configurations, and separate selectively operable means for control of pressure-fluid supply in said lines.

* * * * *